United States Patent
Mei et al.

(10) Patent No.: US 8,275,215 B2
(45) Date of Patent: Sep. 25, 2012

(54) MERGING IMAGES

(75) Inventors: QiPeng Mei, Zhejiang (CN); Liangkui Feng, San Ramon, CA (US); Kaixuan Mao, Milpitas, CA (US); Yushan Huang, Zhejiang (CN); Weining Sun, Zhejiang (CN)

(73) Assignee: ArcSoft (Shanghai) Technology Company, Ltd, Shanghai (CN)

( * ) Notice: Subject to any disclaimer, the term of this patent is extended or adjusted under 35 U.S.C. 154(b) by 1120 days.

(21) Appl. No.: 11/801,202

(22) Filed: May 8, 2007

(65) Prior Publication Data

US 2008/0278518 A1 Nov. 13, 2008

(51) Int. Cl.
*G06K 9/36* (2006.01)
*G06K 9/32* (2006.01)
*G09G 5/00* (2006.01)
*H04N 9/74* (2006.01)
*H04N 9/75* (2006.01)

(52) U.S. Cl. ......... 382/284; 382/294; 345/629; 348/584
(58) Field of Classification Search .................. None
See application file for complete search history.

(56) References Cited

U.S. PATENT DOCUMENTS

| | | | | |
|---|---|---|---|---|
| 5,381,488 A * | 1/1995 | Suda et al. | ..................... | 382/174 |
| 6,005,987 A * | 12/1999 | Nakamura et al. | ............ | 382/294 |
| 6,148,118 A * | 11/2000 | Murakami et al. | ............ | 382/284 |
| 6,813,040 B1 * | 11/2004 | Uchino et al. | .................. | 358/1.9 |
| 6,856,697 B2 * | 2/2005 | Lee et al. | ....................... | 382/177 |
| 7,024,053 B2 * | 4/2006 | Enomoto | ..................... | 382/284 |
| 7,409,105 B2 * | 8/2008 | Jin et al. | ........................ | 382/284 |
| 7,659,923 B1 * | 2/2010 | Johnson | ..................... | 348/218.1 |
| 7,839,422 B2 * | 11/2010 | Agarwala | ...................... | 345/629 |
| 2003/0053692 A1 * | 3/2003 | Hong et al. | ................... | 382/171 |
| 2006/0078224 A1 * | 4/2006 | Hirosawa | ..................... | 382/284 |
| 2008/0170803 A1 * | 7/2008 | Forutanpour | ................. | 382/284 |
| 2008/0181453 A1 * | 7/2008 | Xu et al. | ....................... | 382/103 |
| 2008/0198175 A1 * | 8/2008 | Sun et al. | ...................... | 345/629 |
| 2009/0129700 A1 * | 5/2009 | Rother et al. | ................. | 382/284 |
| 2012/0092446 A1 * | 4/2012 | Peleg et al. | ...................... | 348/25 |

OTHER PUBLICATIONS

Agarwala et al. "Interactive Digital Phtomotage", 2004, ACM SIG-GARAPH '04 Conference Precedings, pp. 1-9.*

* cited by examiner

*Primary Examiner* — Randolph I Chu
(74) *Attorney, Agent, or Firm* — Patent Law Group, LLP; David C. Hsia

(57) ABSTRACT

A method for merging first and second images includes determining a pixel difference image from the first and the second images, determining first and second locations of the foreground subject from the pixel difference image, determining a minimum path of values from the pixel difference image for a region between the first and the second locations of the foreground subject, forming a merged image by stitching the first and the second images along the minimum path, and adjusting pixels of the merged image within a width of the minimum path.

18 Claims, 5 Drawing Sheets
(2 of 5 Drawing Sheet(s) Filed in Color)

US 8,275,215 B2

MERGING IMAGES

FIELD OF INVENTION

This invention relates to a method for merging images.

DESCRIPTION OF RELATED ART

Double exposure with traditional film based camera can be used to capture a foreground subject on different locations of the same background. This technique creates many creative and entertaining photographs, such as a person playing ping pong with herself.

The same concept can be implemented with a digital camera in different ways. In a first method, the digital camera first takes two photographs of the exact same location with the foreground subject at different locations of the same background. Photo editing software then merges the two photographs by placing one on top of the other and making both photographs semi-transparent. However, the resulting image may appear blurry from the placing the two photographs over each other.

In a second method, the user may use a photo editing software to copy a foreground subject and paste it to a different location on the photograph. However, such a method requires the user to manually identify the foreground subject and the direct copy and paste may make the resulting image appear artificial.

Thus, what is needed is a better method to merge two photos having a foreground subject on different locations of the same background.

SUMMARY

In one embodiment of the invention, a method for merging first and second images includes determining a pixel difference image from the first and the second images, determining first and second locations of the foreground subject from the pixel difference image, determining a minimum path of values from the pixel difference image for a region between the first and the second locations of the foreground subject, forming a merged image by stitching the first and the second images along the minimum path, and adjusting pixels of the merged image within a width of the minimum path.

BRIEF DESCRIPTION OF THE DRAWINGS

The patent or application file contains at least one drawing executed in color. Copies of this patent or patent application publication with color drawings will be provided by the Office upon request and payment of the necessary fee.

Use of the same reference numbers in different figures indicates similar or identical elements.

DETAILED DESCRIPTION OF THE INVENTION

Figure 1:
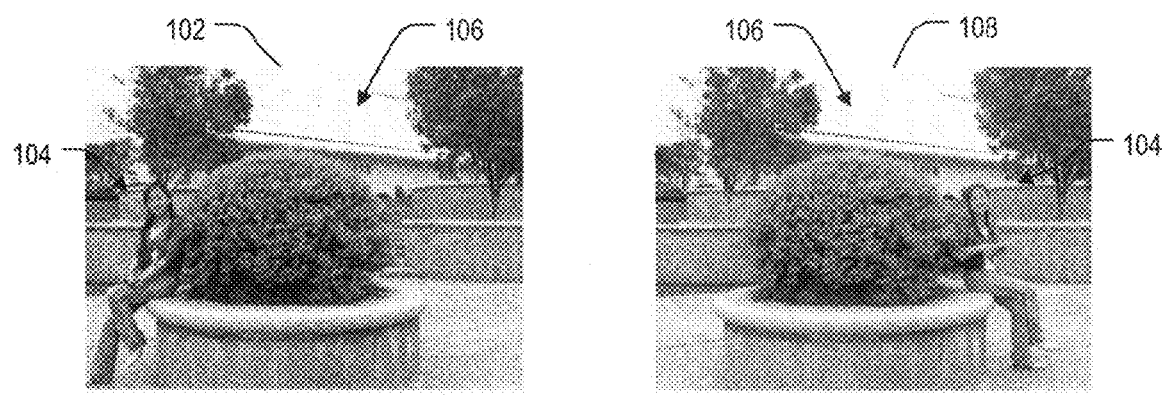
FIG. 1 illustrates two images with a foreground subject at different locations of the same background.
Figure 2:
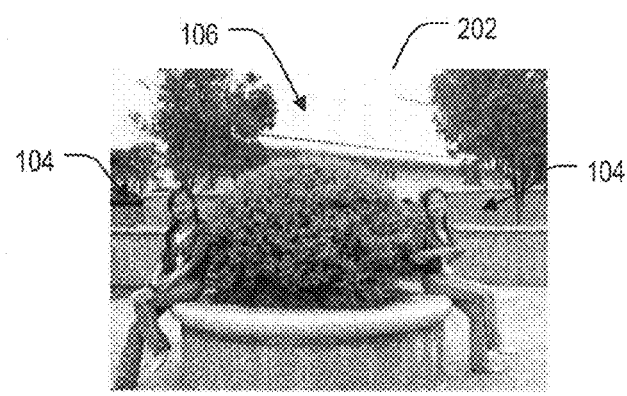
FIG. 2 illustrates a merged image generated from the images of FIG. 1 in one embodiment of the invention.

FIG. 1 illustrates an image 102 (e.g., a digital photograph) having a foreground subject 104 (e.g., a person) and a background generally indicated by a reference numeral 106, and a second image 108 having the same foreground subject 104 at a different location against background 106. FIG. 2 illustrates a merged image 202 generated by a method 300 (FIG. 3) in one embodiment of the invention. Merged image 202 has foreground subject 104 at both locations against background 106.

Figure 3:
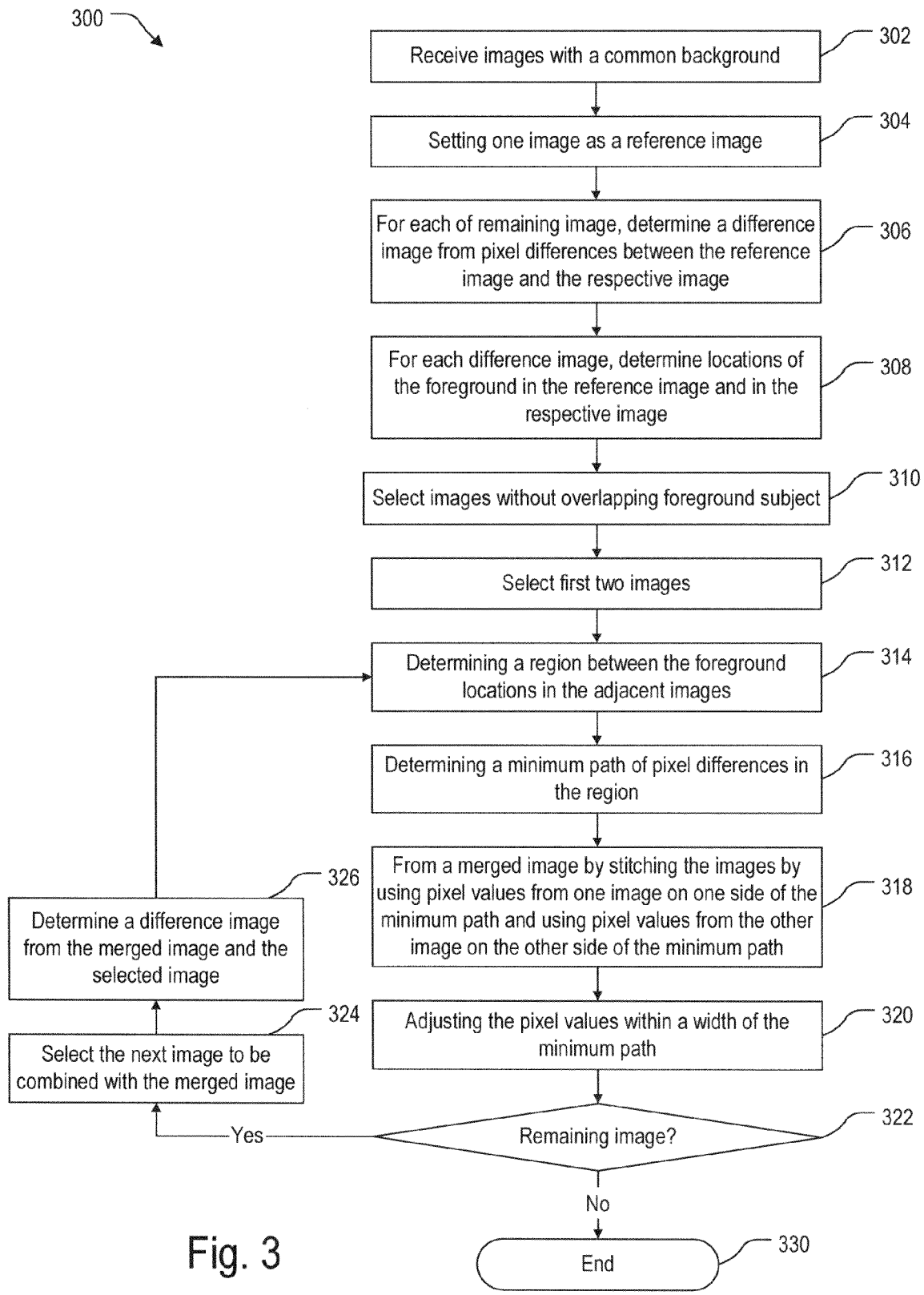
FIG. 3 is a flowchart of method for generating a merged image from multiple images in one embodiment of the invention.

FIG. 3 is a flowchart of method 300 for generating a merged image in one embodiment of the invention. Method 300 is implemented as software executed by a processor on a digital camera for processing images captured by the digital camera. Alternatively, method 300 may be implemented as software executed by a processor on a personal computer, completely in hardware, or other techniques known to one skilled in the art.

Method 300 may be applied to two or more images with the foreground subject at multiple locations against the same background. Method 300 will be explained with an example illustrated through FIGS. 4 and 5.

Figure 4:
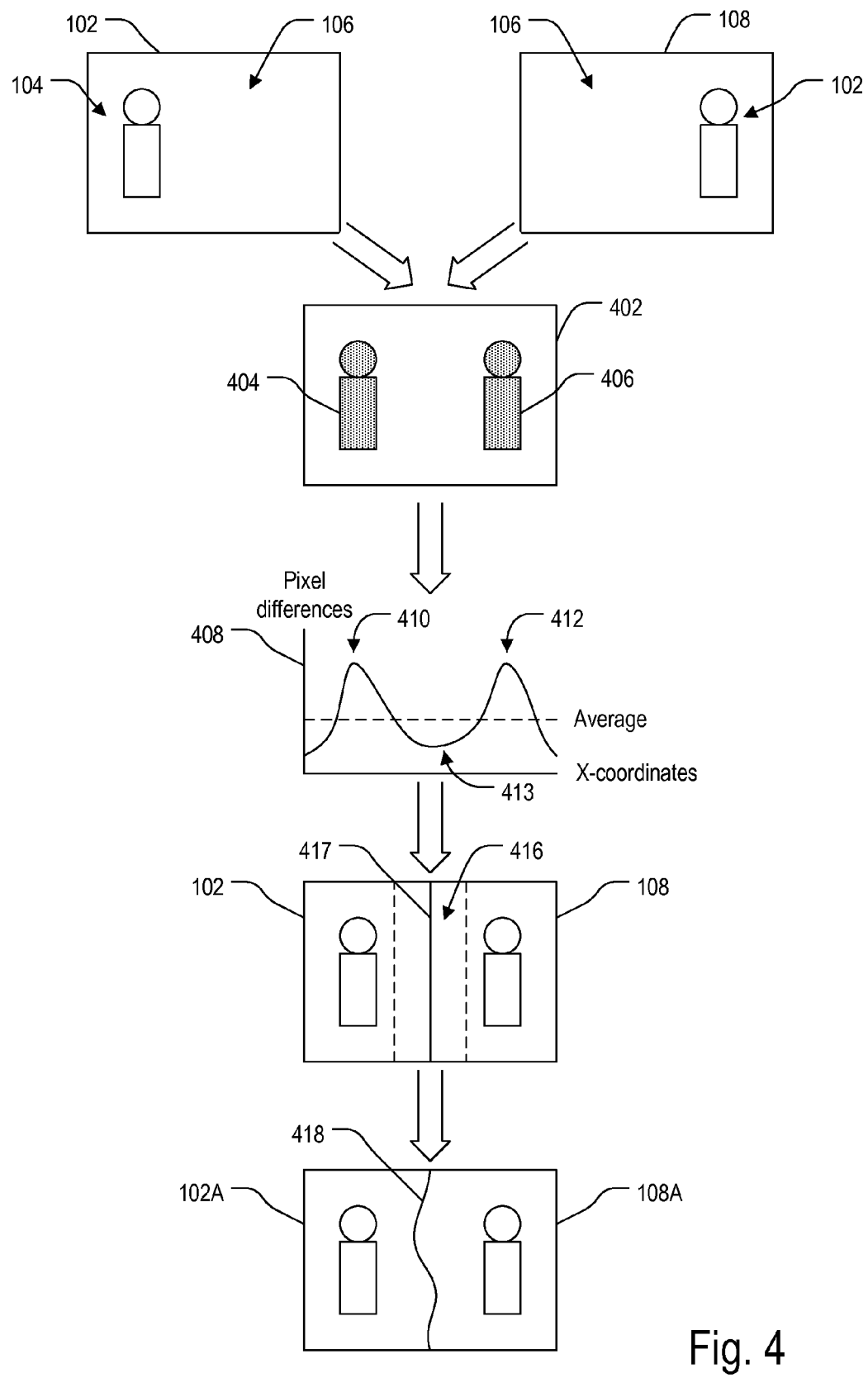
FIGS. 4 and 5 illustrate the application of the method of FIG. 3 to two images in one embodiment of the invention.

In step 302, the processor receives multiple images with a common background. Typically the digital camera is stationary and captures a series of photos where the foreground subjects changes her locations in the photos along one direction (e.g., from left to right or from right to left). The user provides the movement direction of the foreground subject to the processor. In the example of FIG. 4, the digital camera captures images 102 and 108 having foreground subject 104 at two different locations against common background 106. Step 302 is followed by step 304.

In step 304, the processor selects one of the images as a reference image. Typically the processor selects the first image in the series as the reference image. In the example of FIG. 4, the processor selects image 102 as the reference image. Step 304 is followed by step 306.

In step 306, the processor determines multiple difference images by comparing each of the remaining images against the reference image. Specifically, the processor determines the differences in the pixel values for each remaining image and the reference image using the following formula.

$$\text{DiffAbs}(x,y) = |P_1(x,y) - P_2(x,y)|\|_{x,y \in \phi}, \qquad 1.0$$

where DiffAbs(x,y) is the difference image, $P_1(x,y)$ is the pixel value from the reference image at x,y, $P_2(x,y)$ is the corresponding pixel value from a remaining image, and $\phi$ is the range of all pixels in the images.

In the example of FIG. 4, the processor generates a difference image 402. Difference image 402 has areas 404 and 406 with high pixel values since those are the areas where foreground subject 104 are located while all the other pixel locations are shared between images 102 and 108. Step 306 is followed by step 308.

In step 308, the processor determines the locations of the foreground subject in the reference image and in each of the remaining images from the corresponding difference images. Specifically, the processor projects each difference image onto the x-axis. In other words, the processor adds up the pixel differences for each column of pixels.

The processor then determines two peaks separated by a valley from the projection, where one peak indicates the x-coordinate of the foreground subject in the reference image and the other peak indicates the x-coordinate of the foreground subject in a respective remaining image. Specifically, the processor first determines the average of the pixel differences for the projection. The processor then determines the two biggest continuous regions (peak regions) on the projection with pixel differences greater than the average. Similarly, the processor determines the biggest continuous region (valley region) on the projection with pixel differences less than the average. These continuous regions are typically 5 to 20% of the total x-coordinates.

If the valley region is located between the two peak regions, then the processor sets the x-coordinates of the largest values in the peak regions as the foreground locations in the reference image and the respective remaining image. Note that if the valley is not located between the two peaks, then foreground subject 104 in the reference image and the respective remaining image substantially overlaps itself. Such a remaining image is discarded from use.

From these foreground locations, the processor determines the foreground location in the reference image, which is common among all the difference images, and then the foreground locations in the remaining images. As the processor knows the movement direction of the foreground subject, the processor can determine which peak corresponds to the foreground location in the reference image and which peak corresponds to the foreground locations in the remaining images. For example, if the movement direction of the foreground subject is from left to right, then the processor knows the leftmost foreground location in a difference image belongs to the reference image and the rightmost foreground location in the difference image belongs to the remaining image being compared against the reference image.

In the example of FIG. 4, the processor projects difference image 402 onto the x-coordinate to generate a graph 408 having two peaks 410 and 412 separated by a valley 413. The processor then sets the x-coordinate of peak 410 as the x-coordinate of foreground object 104 in reference image 102, and the x-coordinate of peak 412 as the x-coordinate of foreground object 104 in remaining image 108. Step 308 is followed by step 310.

In step 310, the processor selects only those images in the series where the foreground subject does not overlap. The processor does this by determining difference images of consecutive images in the series. When a difference image from two consecutive images does not have two peaks separated by a valley when projected onto the x-axis as described above with step 308, then the later of the two consecutive images is discarded and the earlier of the two consecutive images is compared with the next image in the series to generate another difference image.

For example, assume there are images 0, 1, 2, and 3 in a series. The processor first determines a first difference image between images 0 and 1. If the first difference image produces two peaks separated by a valley when projected onto the x-axis as described above with step 308, then image 1 is retained and compared with image 2 to generate a second difference image and so on.

If the first difference image does not have two peaks separated by a valley, then image 1 is discarded and image 0 is compared with image 2 to generate a second difference image. If the second difference image has two peaks separated by a valley when projected onto the x-axis as described above with step 308, then image 2 is retained and compared with image 3 to generate a third difference image and so on. Step 310 is followed by step 312.

In step 312, the processor selects the first two adjacent images in the series. In the example of FIG. 4, the processor selects images 102 and 104. Step 312 is followed by step 314.

In step 314, the processor determines a region between the foreground locations in the two images. The region has a width W about a midpoint between the foreground locations in the two images. In the example of FIG. 4, the processor determines a region 416 about a midpoint 417 between the foreground locations. Step 314 is followed by step 316.

In step 316, the processor determines a minimum path of pixel differences in the region between the two images. The processor can apply equation 1.0 described above to the region between the two images. Note that if method 300 is being applied to only two images, then the difference image determined in step 306 can be reused in step 316. In the example of FIG. 4, the processor determines a minimum path 418 of pixel difference from difference image 402. Step 316 is followed by step 318.

In step 318, the processor stitches the two images by using pixel values from one image on the left of the minimum path and pixel values from the other image on the right of the minimum path. Specifically, the process uses the pixel values from the image with the foreground location on the left of the minimum path to fill the merged image on the left of the minimum path, and the pixel values from the other image with the foreground location on the right of the minimum path to fill the merged image on the right of the minimum path.

Figure 5:
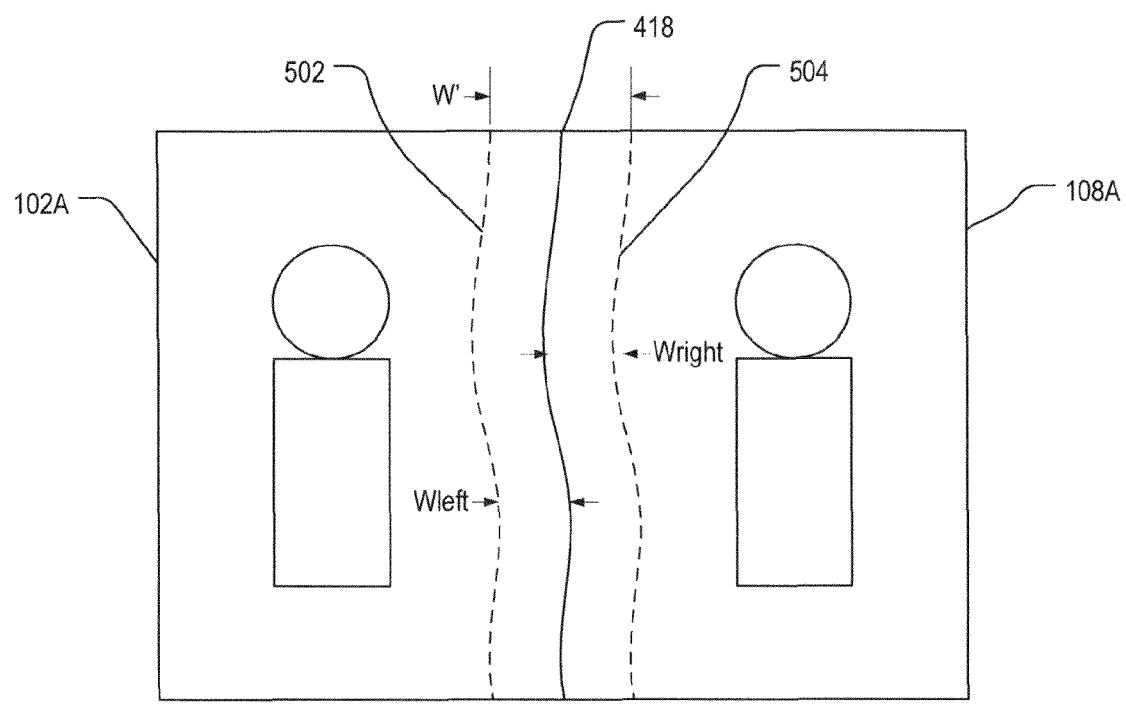

In the example of FIG. 5, the processor uses the pixel values from image 102 to fill a left portion 102A of the merged image on the left of minimum path 418. Similarly, the processor uses the pixel values from image 108 to fill a right portion 108A of the merged image on the right of minimum path 418. Step 318 is followed by step 320.

In step 320, the processor adjusts the pixel values within a width w' of the minimum path to seamlessly blend the two images. Specifically, the processor uses the following formula to blend the pixels from the two images.

$$P_{left}(x,y)=P_L(x,y)+(w'-w_{left}) \times \text{Diff}(y), \text{ and} \qquad 2.0$$

$$P_{right}(x,y)=P_R(x,y)+(w'-w_{right}) \times \text{Diff}(y), \qquad 3.0$$

where $P_{left}(x,y)$ is the value of the resulting pixel of the merged image on the left of the minimum path, $P_L(x,y)$ is the original pixel value of the image with the foreground location on the left of the minimum path, w' is the width about the minimum path, $w_{left}$ is the distance of the left pixel from the minimum path, $P_{right}(x,y)$ is the value of the resulting pixel of the merged image on the right of the minimum path, $P_R(x,y)$ is the original pixel value of the image with the foreground location on the right of the minimum path, and $w_{right}$ is the distance of the right pixel from the minimum path.

In the example of FIG. 5, the processor adjusts the pixel values in the region from minimum path 418 to a width $w_{left}$ to a line 502 according to equation 2.0. Similarly, the processor adjusts the pixel values in the region from minimum path 418 to a width $w_{right}$ to a line 504 according to equation 3.0. Step 320 is followed by step 322.

In step 322, the processor determines if there is another remaining image that has not been processed. If so, then step 322 is followed by step 324. Otherwise step 322 is followed by step 330, which ends method 300.

In step 324, the processor selects a next image in the series to be combined with the merged image generated from step 320. Step 324 is followed by step 326.

In step 326, the processor determines a difference images by comparing the merged image and the selected image using Equation 1.0. The processor also sets one of the foreground locations of the merged image that is the closest to the foreground location in the selected image as the foreground location of the merged image. Note that the processor already knows the foreground locations in the merged image and the selected image from step 308. Step 326 is followed by step 314 and the method repeats until all the remaining images have been merged.

Figure 6:
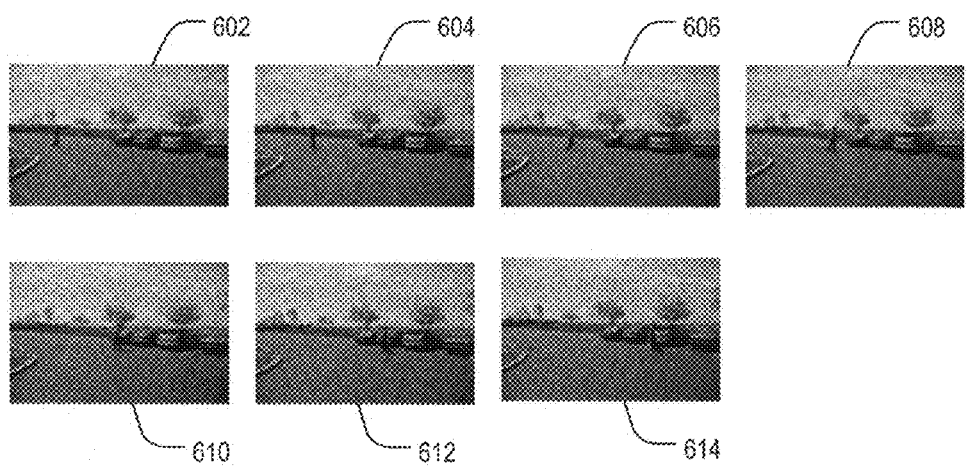
FIG. 6 illustrates multiple images with a foreground subject at different locations on the same background.
Figure 7:
FIG. 7 illustrates a merged image generated from the images of FIG. 6 in one embodiment of the invention.

FIG. 6 illustrates a series of images 602, 604, 606, 608, 610, 612, and 614 with a foreground subject a different locations against a common background. FIG. 7 illustrates a merged image 702 generated by method 300 in one embodiment of the invention. As can be seen, the same effect as FIG. 2 can be achieved with more than two images where the foreground subject is located more than two locations against the common background.

Various other adaptations and combinations of features of the embodiments disclosed are within the scope of the invention. Numerous embodiments are encompassed by the following claims.

The invention claimed is:

1. A method to merge first and second images having a foreground subject at different locations of a same background to form a merged image, comprising:
    determining, by a processor, a pixel difference image from the first and the second images, wherein each pixel of the pixel difference image comprises an absolute difference between corresponding pixels in the first and the second images;
    from the pixel difference image, determining, by the processor, first and second locations of the foreground subject in the first and the second images, respectively;
    for a region between the first and the second locations of the foreground subject, determining, by the processor, a minimum path of values extending from a top to a bottom of the merged image from the pixel difference image;
    forming, by the processor, the merged image by stitching the first and the second images along the minimum path by using pixels from the first image on a first side of the minimum path and using pixels from the second image on a second side of the minimum path; and
    displaying the merged image.

2. The method of claim 1, wherein said determining first and second locations of the foreground subject comprises:
    projecting the pixel difference image onto an x-axis;
    determining two peaks separated by a valley in the projection; and
    setting x-coordinates of the two peaks as the first and the second locations of the foreground subject.

3. The method of claim 2, wherein said determining two peaks separated by a valley comprises:
    determining an average of pixel differences on the projection;
    determining two biggest continuous regions on the projection with pixel differences greater than the average;
    determining a biggest continuous region on the projection with pixel differences less than the average; and
    when the biggest continuous region is located between the two biggest continuous regions, setting x-coordinates of two largest pixel differences in the two biggest continuous regions as the first and the second locations of the foreground subject.

4. The method of claim 1, further comprising:
    adjusting pixels of the merged image within a width of the minimum path.

5. The method of claim 4, wherein said adjusting comprises adjusting each pixel in proportion to its horizontal distance from the minimum path.

6. The method of claim 5, wherein said adjusting each pixel comprises determining pixel values as follows:

$$P_{left}(x,y)=P_L(x,y)+(w'-w_{left})\times \text{Diff}(y), \text{ and}$$

$$P_{right}(x,y)=P_R(x,y)+(w'-w_{right})\times \text{Diff}(y),$$

where $P_{left}(x,y)$ is a value of a left pixel of the merged image on the left of the minimum path, $P_L(x,y)$ is an original value of the left pixel from one of the first and the second images, w' is the width about the minimum path, $w_{left}$ is the distance of the left pixel from the minimum path, $P_{right}(x,y)$ is a value a right pixel of the merged image on the right of the minimum path, $P_R(x,y)$ is an original value of the right pixel from another of the first and the second images, $w_{right}$ is the distance of the right pixel from the minimum path, and Diff(y) is a corresponding value from the minimum path for the left and the right pixels.

7. The method of claim 1, further comprising:
    determining another pixel difference image from the first image and a third image;
    from the another pixel difference image, determining a third location of the foreground subject in the third image;
    determining yet another pixel difference image from the merged image and the third image;
    for another region between the second and the third locations of the foreground subject, determining another minimum path of values from the yet another pixel difference image;
    forming another merged image by stitching the merged image and the third image along the another minimum path by using pixels from the merged image on one side of the another minimum path and using pixels from the third image on another side of the another minimum path; and
    adjusting pixels of the another merged image within a width of the another minimum path.

8. The method of claim 1, further comprising:
    determining if the foreground subject in the second image and a third image does not overlap;
    when the foreground subject in the second and the third images does not overlap:
        determining another pixel difference image from the merged image and the third image;
        for another region between the second location and a third location of the foreground subject in the third image, determining another minimum path of values from the another pixel difference image;
        forming another merged image by stitching the merged image and the third image along the another minimum path by using pixels from the merged image on one side of the another minimum path and using pixels from the third image on another side of the another minimum path; and
        adjusting pixels of the another merged image within a width of the another minimum path.

9. The method of claim 8, wherein said determining if the foreground subject in the second and the third images overlaps comprises:
    determining a further pixel difference image from the second and the third images;
    projecting the further pixel difference image onto an x-coordinate, where the foreground subject in the second and the third images does not overlap when there are two distinctive peaks in the projection.

10. A non-transitory computer-readable storage medium encoded with executable instructions for execution by a processor to merge first and second images having a foreground subject at different locations of a same background to form a merged image, the instructions comprising:

determining a pixel difference image from the first and the second images, wherein each pixel of the pixel difference image comprises an absolute difference between corresponding pixels in the first and the second images;

from the pixel difference image, determining first and second locations of the foreground subject in the first and the second images, respectively;

for a region between the first and the second locations of the foreground subject, determining a minimum path of values extending from a top to a bottom of the merged image from the pixel difference image;

forming the merged image by stitching the first and the second images along the minimum path by using pixels from the first image on a first side of the minimum path and using pixels from the second image on a second side of the minimum path; and displaying the merged image.

11. The non-transitory computer-readable storage medium of claim 10, wherein said determining first and second locations of the foreground subject comprises:

projecting the pixel difference image onto an x-axis;

determining two peaks separated by a valley in the projection; and setting x-coordinates of the two peaks as the first and the second locations of the foreground subject.

12. The non-transitory computer-readable storage medium of claim 11, wherein said determining two peaks separated by a valley comprises:

determining an average of pixel differences on the projection;

determining two biggest continuous regions on the projection with pixel differences greater than the average;

determining a biggest continuous region on the projection with pixel differences less than the average; and when the biggest continuous region is located between the two biggest continuous regions, setting x-coordinates of two largest pixel differences in the two biggest continuous regions as the first and the second locations of the foreground subject.

13. The non-transitory computer-readable storage medium of claim 10, wherein the instructions further comprise:

adjusting pixels of the merged image within a width of the minimum path.

14. The non-transitory computer-readable storage medium of claim 13, wherein said adjusting comprises adjusting each pixel in proportion to its horizontal distance from the minimum path.

15. The non-transitory computer-readable storage medium of claim 14, wherein said adjusting each pixel comprises determining pixel values as follows:

$$P_{left}(x,y)=P_L(x,y)+(w'-w_{left})\times \text{Diff}(y), \text{ and}$$

$$P_{right}(x,y)=P_R(x,y)+(w'-w_{right})\times \text{Diff}(y),$$

where $P_{left}(x,y)$ is a value of a left pixel of the merged image on the left of the minimum path, $P_L(x,y)$ is an original value of the left pixel from one of the first and the second images, w' is the width about the minimum path, $w_{left}$ is the distance of the left pixel from the minimum path, $P_{right}(x,y)$ is a value a right pixel of the merged image on the right of the minimum path, $P_R(x,y)$ is an original value of the right pixel from another of the first and the second images, $w_{right}$ is the distance of the right pixel from the minimum path, and Diff(y) is a corresponding value from the minimum path for the left and the right pixels.

16. The non-transitory computer-readable storage medium of claim 10, wherein the instructions further comprise:

determining another pixel difference image from the first image and a third image;

from the another pixel difference image, determining a third location of the foreground subject in the third image;

determining yet another pixel difference image from the merged image and the third image;

for another region between the second and the third locations of the foreground subject, determining another minimum path of values from the yet another pixel difference image;

forming another merged image by stitching the merged image and the third image along the another minimum path by using pixels from the merged image on one side of the another minimum path and using pixels from the third image on another side of the another minimum path; and adjusting pixels of the another merged image within a width of the another minimum path.

17. The non-transitory computer-readable storage medium of claim 10, wherein the instructions further comprise:

determining if the foreground subject in the second image and a third image does not overlap;

when the foreground subject in the second and the third images does not overlap:

determining another pixel difference image from the merged image and the third image;

for another region between the second location and a third location of the foreground subject in the third image, determining another minimum path of values from the another pixel difference image;

forming another merged image by stitching the merged image and the third image along the another minimum path by using pixels from the merged image on one side of the another minimum path and using pixels from the third image on another side of the another minimum path; and adjusting pixels of the another merged image within a width of the another minimum path.

18. The non-transitory computer-readable storage medium of claim 17, wherein said determining if the foreground subject in the second and the third images overlaps comprises:

determining a further pixel difference image from the second and the third images;

projecting the further pixel difference image onto an x-coordinate, where the foreground subject in the second and the third images does not overlap when there are two distinctive peaks in the projection.

\* \* \* \* \*